United States Patent [19]

Green et al.

[11] Patent Number: 5,664,110
[45] Date of Patent: Sep. 2, 1997

[54] REMOTE ORDERING SYSTEM

[75] Inventors: Jonathan B. Green, Belmont; William R. Pope, Cambridge, both of Mass.

[73] Assignee: Highpoint Systems, Inc., Belmont, Mass.

[21] Appl. No.: 351,795

[22] Filed: Dec. 8, 1994

[51] Int. Cl.$^6$ .................. G06F 7/06; G06F 17/30
[52] U.S. Cl. .................. 705/26; 705/1; 705/27
[58] Field of Search .................. 364/401, 406, 364/408, 403; 340/825.32, 825.35; 235/379–383; 395/201, 226, 227

[56] References Cited

U.S. PATENT DOCUMENTS

| | | | |
|---|---|---|---|
| 4,654,482 | 3/1987 | DeAngelis | 379/95 |
| 4,734,858 | 3/1988 | Schlafly | 364/408 |
| 4,882,475 | 11/1989 | Miller et al. | 235/383 |
| 4,897,865 | 1/1990 | Canuel | 379/91 |
| 4,947,028 | 8/1990 | Gorog | 235/381 |
| 4,972,318 | 11/1990 | Brown et al. | 364/403 |
| 4,984,155 | 1/1991 | Geier et al. | 364/401 |
| 5,023,904 | 6/1991 | Kaplan et al. | 379/91 |
| 5,047,614 | 9/1991 | Bianco | 235/385 |
| 5,117,354 | 5/1992 | Long et al. | 364/401 |
| 5,195,130 | 3/1993 | Weiss et al. | 379/98 |
| 5,250,789 | 10/1993 | Johnsen | 235/383 |
| 5,319,542 | 6/1994 | King, Jr. et al. | 364/401 |

OTHER PUBLICATIONS

Fergenoff, "CD–ROM Comes home=Bell Atlantic's intelligent home of the 21st century. (home–based information services)", CD–ROM News Extra, v. 1, n. 6, p. 16(4), Dec. 1993, Dialog File 148, Acc. #06795500.

"Thomas Unveils Online Purchasing Network (Thomas Publishing introduces Connects electronic corporate purchasing network for industrial products)", Electronic Buyers News, p.60, Dec. 11, 1995, Dialog file 9, Acc. No. 01355145.

Bethoney, "Made to order for online catalogs (iCat's Electronic commerce suite . . . )", PC Week, vol. 13, No. 45, p.80(1), Nov. 11, 1996, Dialog file 47 Acc. No. 04634978.

Staten, "iCat to do Net commerce. (Interactive Catalog's iCat Electronic Commerce Suite) . . . ", MacWeek, v. 10, n. 17, p.18(2), Apr. 29, 1996, Dialog file 148, Acc. No. 08633302.

Primary Examiner—Gail O. Hayes
Assistant Examiner—Frantzy Poinvil
Attorney, Agent, or Firm—Weingarten, Schurgin, Gagnebin & Hayes LLP

[57] ABSTRACT

A remote ordering system provides a user the ability to build and edit one or more order lists, resident in memory within a user device, and the further ability to review and manipulate a user interpretable display of the contents of such lists. A system comprising merchant stock databases, a data format/transfer computer (DFTC), and display/processor units (DPUs) (the user devices) enable creation and transmission of the order lists. Coded data read into each DPU identifies items to be added to the order lists. A DPU database contains user-discernable item information stored according to the associated coded data and is capable of learning new or updating old item information when in communication with the merchant database. Item information can be automatically or manually deleted to free DPU memory.

75 Claims, 15 Drawing Sheets

REMOTE ORDERING SYSTEM

FIELD OF THE INVENTION

The present invention relates to the field of remote ordering systems, and in particular to a remote ordering system which enables the building of a database of user-discernable product or service identification information within a user-accessible device.

BACKGROUND OF THE INVENTION

Remote ordering systems have been proposed for providing homeowners and business-persons the ability to order staple items from one or more merchants without the need to travel to a merchant location. However, such prior art systems have failed to provide the user with adequate information necessary for tracking or editing orders made or lists compiled.

Typically, prior art remote ordering systems provide some form of optical or magnetic scanner associated with a remote interface for reading coded product identification information found on product packaging. Most such systems, such as U.S. Pat. No. 4,654,482 (DeAngelis), provide an indication that a product code has been scanned, either via an audible tone or a visual indicator such as an LED. However, none of the prior art systems describes how to produce a user-interpretable description of the products placed in a list of items based on the scanned codes such as manufacturer and product name, product size, and product cost while such list is being constructed. For example, user-readable product descriptions are only provided in DeAngelis once an order list has been completed and conveyed to a merchant's order receiving apparatus, and only while connected to a merchant's order receiving apparatus.

SUMMARY OF THE INVENTION

A remote ordering system according to the present invention provides a user the ability to build and edit one or more order lists, resident in memory within a user device, and the further ability to review a user interpretable display of the contents of such lists. The present invention provides multiple merchant stock databases, a data format/transfer computer (DFTC) as an interface between customers and the merchant databases, and a user device referred to as a display/processor unit (DPU) at each of multiple customer sites for creating and transmitting order lists.

The DPU, in an illustrative embodiment, includes of a user identification code card and a data entry device providing desired item, user, and merchant data to the remainder of the DPU. To create an order list, an item code, provided by the data entry device, is checked against a DPU internal database. For instance, the item code can be provided by scanning an optical wand over a bar code. If user-discernable information corresponding to the item code, including product manufacturer, product description, and unit price, is in the DPU database, this information is displayed to the user via a DPU display. Else, the DPU communicates with the DFTC and thence to a specified merchant database to retrieve such user-discernable information, adds it to the DPU database, and updates the displayed list. In this manner, a DPU database of user-discernable product information (also referred to as user-cognizable identifiers) is created such that order lists, comprised of products or services to be ordered, can be visually reviewed, modified, and/or confirmed by the user without communication between the DPU and an associated DFTC.

Once the order list is complete, the user identification code card is provided to the data entry device. Coded information read from the card represents user name and address, merchant name and address, and other order specific information pertinent to this user and merchant, and is interpreted by the DFTC. The order list created within the DPU is processed in conformity with this coded information.

BRIEF DESCRIPTION OF THE DRAWINGS

These and other features of the present invention are more fully set forth below in the fully exemplary detailed description and accompanying drawings of which.

DETAILED DESCRIPTION

Figure 1:
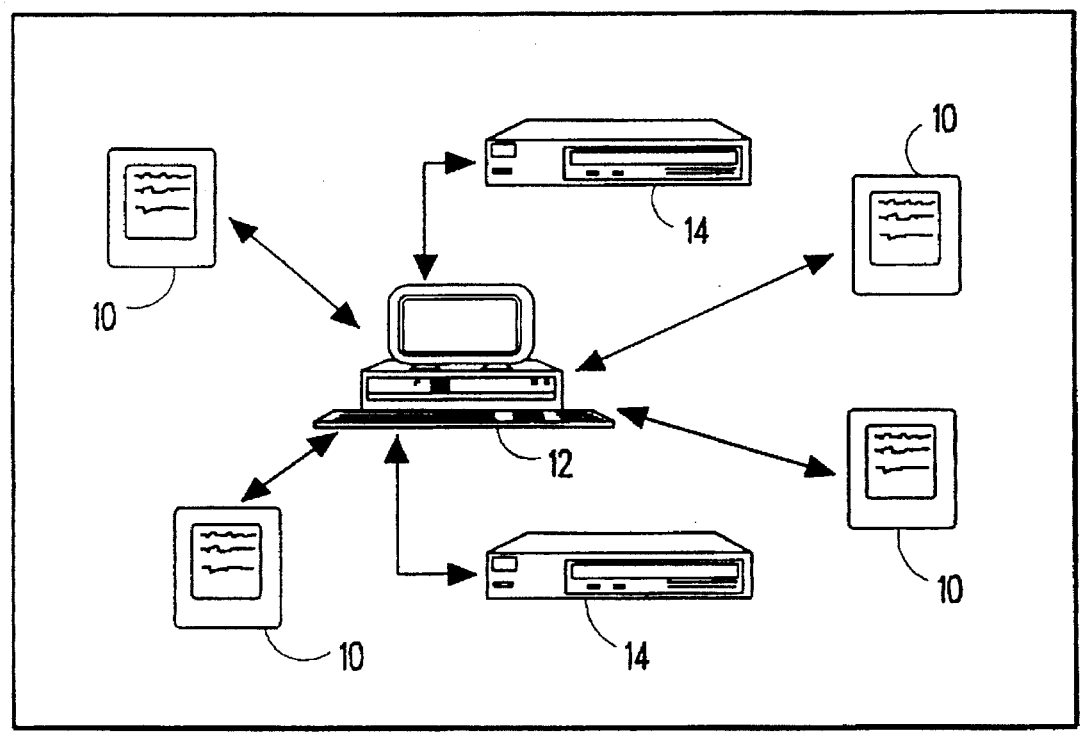
FIG. 1 is a schematic representation of the remote ordering system according to the present invention.

A remote ordering system according to the present invention and FIG. 1 includes at least one user device referred to as a display/processor unit (DPU) 10 or a remote ordering terminal, a data format/transfer computer (DFTC) 12 (also referred to as a central processing means or a central computer), and at least one merchant database 14 (also referred to as a central inventory database). In an exemplary embodiment used in the present description, one DPU 10 is in communication with one merchant database 14 through a DFTC 12. However, it is envisaged that each system will typically have multiple DPUs 10 and merchant databases 14.

While a discrete piece of hardware has been identified as the merchant database 14 in FIG. 1, it is to be understood that throughout this document the merchant database 14 refers to a database of information not having one specific physical location. That is, the merchant database 14 can be physically located within the DFTC 12, within another computer or memory device located at the site of the DFTC 12 and connected thereto, or within a computer or memory device at a merchant location.

Figure 2:
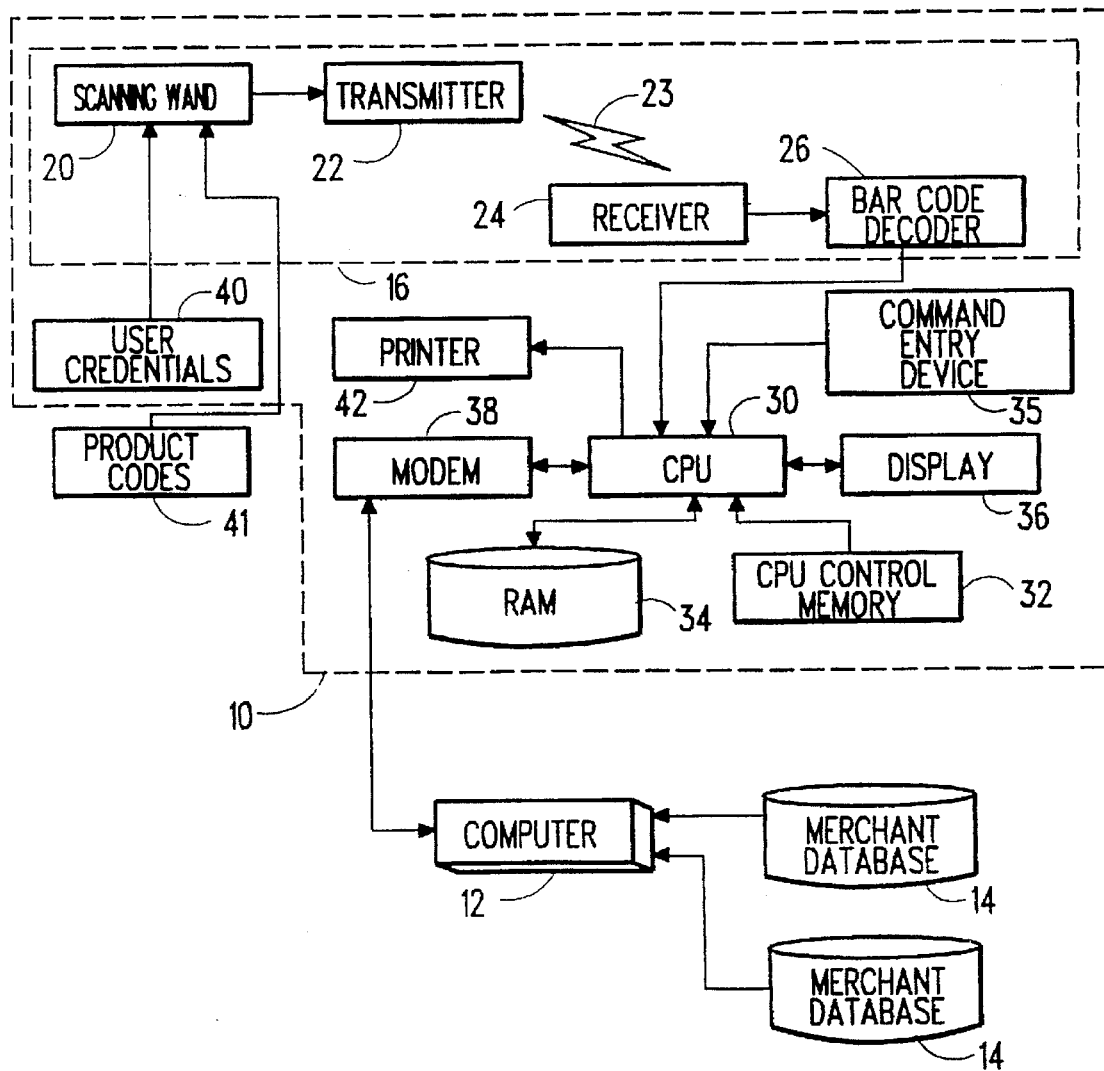
FIG. 2 is a further schematic representation of the system of FIG. 1.

As illustrated in FIG. 2, each DPU 10 is partially comprised of a data entry device 16 which provides coded information to the rest of the DPU 10. In the embodiment of FIG. 2, the data entry device 16 is made up of an optical scanning wand 20 having an RF transmitter 22 in communication with an RF receiver 24, and made up of a bar code decoder 26. It is intended that the scanning wand be passed over some form of bar code 41, whether printed on packaging for a desired product, in a catalog of codes, on coupons, or printed on a credit-card sized identification control card. The specific bar code employed can be Code 128, Codabar, or one of the UPC (UPC-A, UPC-E) or EAN (EAN-8, EAN-13) codes, or any other code including system specific code. In any case, the received code is interpreted by the bar code decoder 26 to provide a common representation of the coded information, such as in ASCII format.

The RF linked scanning wand provides superior portability in a light-weight package. However, a number of other suitable devices are envisaged for the data entry device 16. Specifically, an optical, hard-wired scanning wand 20 may be employed in lieu of the wand 20, RF transmitter 22, RF link 23 and RF receiver 24. Thus, the link 23 can represent a path for optical, audio, RF, IR or any other energy capable of conveying information. Further, a portable optical scanning wand 20 having a limited amount of memory may be employed to gather and store coded information within the wand 20. This scanned information is then transferred to the remainder of the DPU 10 by the appropriate link 23. Further alternative embodiments of the data entry device 16 of the present invention employ a standard "QWERTY" keyboard or custom keypad in communication with the remainder of the DPU 10 for manual data input, or voice-recognition circuitry or magnetic stripe input means.

In a smart terminal version of the DPU 10 shown in FIG. 2, a central processing unit (CPU) 30 and associated CPU control memory 32 manage the DPU 10 operations. In the illustrated embodiment, the control memory 32 is read-only memory (ROM). The other memory associated with the CPU 30 in this embodiment is a random access memory (RAM) 34. This RAM 34 can be subdivided into a submemory for maintenance and storage of a database of user-discernable information correlating to user-input codes (also referred to as a database memory), a submemory for maintenance and storage of custom reference lists, and a submemory for maintenance and storage of one or more active ordering lists. The custom reference lists referred to include sublists which a user may wish to recall and incorporate into an order list currently being constructed. Examples of such custom reference lists include: a) a list of perishables regularly ordered from a grocery; b) a list of office products such as staples and paper regularly ordered from a stationary supplier; and, c) a list of dairy products regularly ordered from a dairy. User-discernable information, as referred to herein, includes descriptions of products or services selected by a user, typically including manufacturer, item name or description, unit size, and unit cost. Depending upon the item (product or service) selected, other information can be displayed to the user.

Note that in alternative embodiments, the DPU 10 can have only one memory such as RAM 34, the CPU control functions being downloaded thereto upon communication with the DFTC 12. Further, it is envisaged in alternative embodiments that the CPU control functions are both found in ROM 32 as well as in RAM 34. Thus, the illustrated memory configuration is but one acceptable alternative.

A further alternative configuration for the DPU 10 includes a removable media interface associated with the RAM 34. For instance, this interface can be a CD-ROM reader, a magnetic diskette reader, a PCMCIA card interface, or any other form of interface for a removable data storage element. This configuration thus enables the DPU 10 to have a database of user-discernable information correlating to user-input codes (the database memory) which can, at least in part, be updated en masse. The RAM 34 associated with the removable media provides storage for user-discernable information not found on the removable media, and provides storage for more current information associated with certain user-input codes than that found on the removable media. Thus, references herein to "a DPU database stored within a database memory in RAM" includes, in this alternative embodiment, a DPU database stored within a database memory in RAM and in removable media associated with the DPU.

Without establishing communications between the DPU 10 and the DFTC 12, data from the data entry device 16 (referred to as input code) to the CPU 30 is checked against a DPU 10 database stored within a database memory in RAM 34. If user-discernable information correlating to the input code exists within the database memory in RAM 34, the user-discernable information is added to a list of products to be ordered being constructed within the RAM 34. Simultaneously, the user-discernable information is provided to a display 36 under the control of the CPU 30 where the information is added to the displayed list of products being ordered. The CPU 30 is in charge of creating and displaying order lists on the display 36. Note that the user-discernable information can be presented to the user as printed text, graphic images, or a combination of both. Thus, list building, reviewing, and/or modification is done on the DPU 10 without a communications link being established between the DPU 10 and the DFTC 12.

Once the user has completed an order list, the CPU 30 can receive commands from the user via a command entry device 35 to convey the list to a merchant. The specific steps involved will be discussed subsequently. In an illustrative embodiment of the DPU 10 according to the present invention, the command entry device 35 is a display 36 having a touch-sensitive screen. This touch sensitivity can be implemented through an IR or heat sensitive display 36 or electrically conductive grids on the display 36. Other embodiments of the command entry device 35 for transmission of user commands include touch-responsive icons on an electro-optical display 36, programmable buttons located on the DPU 10 housing and proximate to the display 36, and a keyboard attached to the DPU 10. In yet another embodiment, the DPU 10 receives user instructions via a command entry device 35 such as a mouse, light pen, trackball or remote pointing device such as an air mouse, each either in wired or wireless communication with the DPU 10, as appropriate. Further, the same device can be used to perform the functions of both the data entry device 16 and the command entry device 35.

In response to these user instructions, the CPU 30 can command a modem 38 to establish telephone communications, either cellular or wired, with the DFTC 12. Alternative embodiments of the present invention can employ interactive CATV, satellite communications, or fiber-optic data transmission for the link between the DPU 10 and the DFTC 12. The DPU 10 is used to initiate an interactive session with the DFTC 12 after an order has been compiled within the DPU 10. The DPU 10 can also initiate an interactive session with the DFTC 12 when identification, price or nutritional information regarding a particular product is desired by a user and is not found within a DPU 10 database.

The DFTC 12 controls the flow of information between the DPU 10 and the merchant database 14 during such an interactive session. The DFTC 12 communicates with the merchant database 14 to ascertain product availability, product identification information such as name, container size, and nutritional data, and current product price. This information is then relayed back to the DPU 10 for display to the user and for addition to or substitution within the DPU 10 database. Depending upon the actual physical location of the merchant database 14, this communication can be a telephonic serial data transfer, a serial or parallel transfer of information over a data bus or link, or a serial transfer of information over a communications network such as the Internet. Other known communication means are envisioned.

The DFTC 12 also interprets information entered from user identification control cards 40 reflective of user and merchant identification. Typically, these identification control cards 40 provide information from which merchant name and location, user name, address and account number, payment arrangements, preferred product delivery option, and consumer profile can be determined. In alternative embodiments of the present invention, the DPU 10 has such user and merchant identification pre-stored therein, such that the user selects a merchant from a displayed menu of merchants. The appropriate account number, preferred delivery mode, etc. can then be automatically selected, or the user can choose an account number along with other appropriate parameters from another displayed menu. In any case, information identifying the user and the desired merchant, among other transaction specific information, is referred to as a transaction identifier or as identifier means.

The DFTC 12 also provides advertising to the display 36 pertinent to the merchant being accessed and potentially according to the user profile. This advertising draws the attention of the user to special sale items. An exemplary advertising screen will be discussed in conjunction with FIGS. 7 and 8. Other information can be conveyed in addition to or in place of advertising. For instance, a message indicative of an available credit limit or past due payments can be displayed, as well as a summary of payment or delivery options selected.

As depicted in FIG. 2, the DFTC 12 serves as an intermediary between the DPU 10 and one or more merchant databases 14. Note that, as shown in FIG. 1, more than one DPU 10 can be in communication with any one DFTC 12, and thence to a plurality of merchant databases 14. Typically, a DFTC 12 will access a merchant database 14 upon receipt of an order from a DPU 10. The computer 12 can verify that the merchant database 14 reflects availability of a sufficient quantity of the items requested and can confirm the preferred mode of payment and order delivery, both for the user and the merchant, by searching the merchant database 14. The DFTC 12 can also access the merchant database 14 upon receipt of a request from a DPU 10 to update the DPU database memory in RAM 34.

Note that the communication links between an individual DPU 10 and an associated DFTC 12, and between the DFTC 12 and a merchant database 14, need not be concurrently established. Thus, if the communications link between the DFTC 12 and the merchant database 14 is unavailable for any reason, the DPU 10 is not tied up pending successful establishment of this link. The DFTC 12 can, as a result of periodic communications with the merchant database 14, supply the DPU 10 with the requested information. Further, the DFTC 12 can cause an indication to be displayed on the DPU 10 that the user should attempt the operation requiring DFTC-merchant database communication again at a later time.

If the DPU 10 has never been used to order a particular item and if the DPU 10 database was not preloaded with user-discernable information relating to the particular time, the DPU 10 database stored in RAM 34 will be unable to provide the user with a user-discernable interpretation of the product identifying code and/or a most-recent per unit cost, since list building is ordinarily performed "off-line", or in the absence of DPU 10-DFTC 12 communications. Instead, the DPU 10 can display, for instance, a numerical representation of the scanned code information. Under most circumstances, this information will be of little use to the DPU 10 user, who can command the DPU 10 to search the merchant database 14 via the DFTC 12 for user-discernable product description. In an alternative embodiment, price information can also be returned in conjunction with the user-discernable product information. As noted, the returned user-discernable information, including unit cost if desired, is stored within the DPU 10 database in the database memory within RAM 34, and is substituted for the numerical representation on the DPU display 36.

In a further alternative embodiment of the present remote ordering system, each DPU 10 may be issued to a user with a pre-programmed DPU database stored within RAM 34. Such a database stored therein can include common household staple items such as milk, bread, butter, etc. for a DPU 10 to be used primarily for grocery ordering, though other items are envisaged depending upon the intended use. Thus, in addition to being delivered with an empty database in RAM 34, a DPU 10 may come with a standard pre-programmed database in RAM 34, a pre-programmed database in RAM 34 configured for a particular user, or a pre-programmed database in RAM 34 configured for a particular merchant.

In yet another embodiment of the present invention, if a DPU 10 user believes a price associated with a displayed product description is out-of-date, the user can command the DPU 10 to update the price in the DPU database within RAM 34 by accessing the merchant database 14 via the DFTC 12. The merchant database 14 can indicate the current price, which the DFTC 12 returns to the DPU CPU 30 for substitution into the database in RAM 34. The merchant database 14 can also return information on alternative products if ordered products are out of stock or are not carried by that merchant.

The steps involved in updating the DPU 10 database are further explored in conjunction with exemplary display screens and operational flow charts, as described below.

The DPU 10 can also have an associated printer 42 as illustrated in FIG. 2. This enables a user to make a hard copy of one or more order lists prior to list deletion. The printer 42 can be housed within a DPU 10 housing, or can be a peripheral device attached to the DPU 10 housing. Other peripheral devices which can be employed with the DPU 10 include but are not limited to a magnetic memory read/write device such as a disk drive, PCMCIA cards, a magnetic stripe card reader, or a voice recognition circuit and associated hardware.

In addition to printing a processed order list, the order list can be stored within the DPU RAM 34. Thus, as described above, custom reference lists can be created for frequently ordered items. These lists can be periodically recalled from database memory 34 by the user, edited according to the user's present needs, used as the basis for a new order, and stored anew. Alternatively, the newly modified list can be discarded, leaving the original list in memory 34. In this manner, a number of useful lists can be created and stored within database memory 34 for subsequent retrieval and use by a user. Further, one list can serve as the basis for a number of lists, each developed according to products offered by a respective merchant.

In FIGS. 3–10, exemplary DPU display screens are illustrated, roughly following a sequence of steps involved in creating and submitting an order list. Note that variations in the format and order of the illustrated screens is within the scope of the present invention. These figures will also be discussed in conjunction with flow charts depicted in FIG. 11–14, in which the operation of the remote ordering system according to the present invention is mapped.

Figure 3:
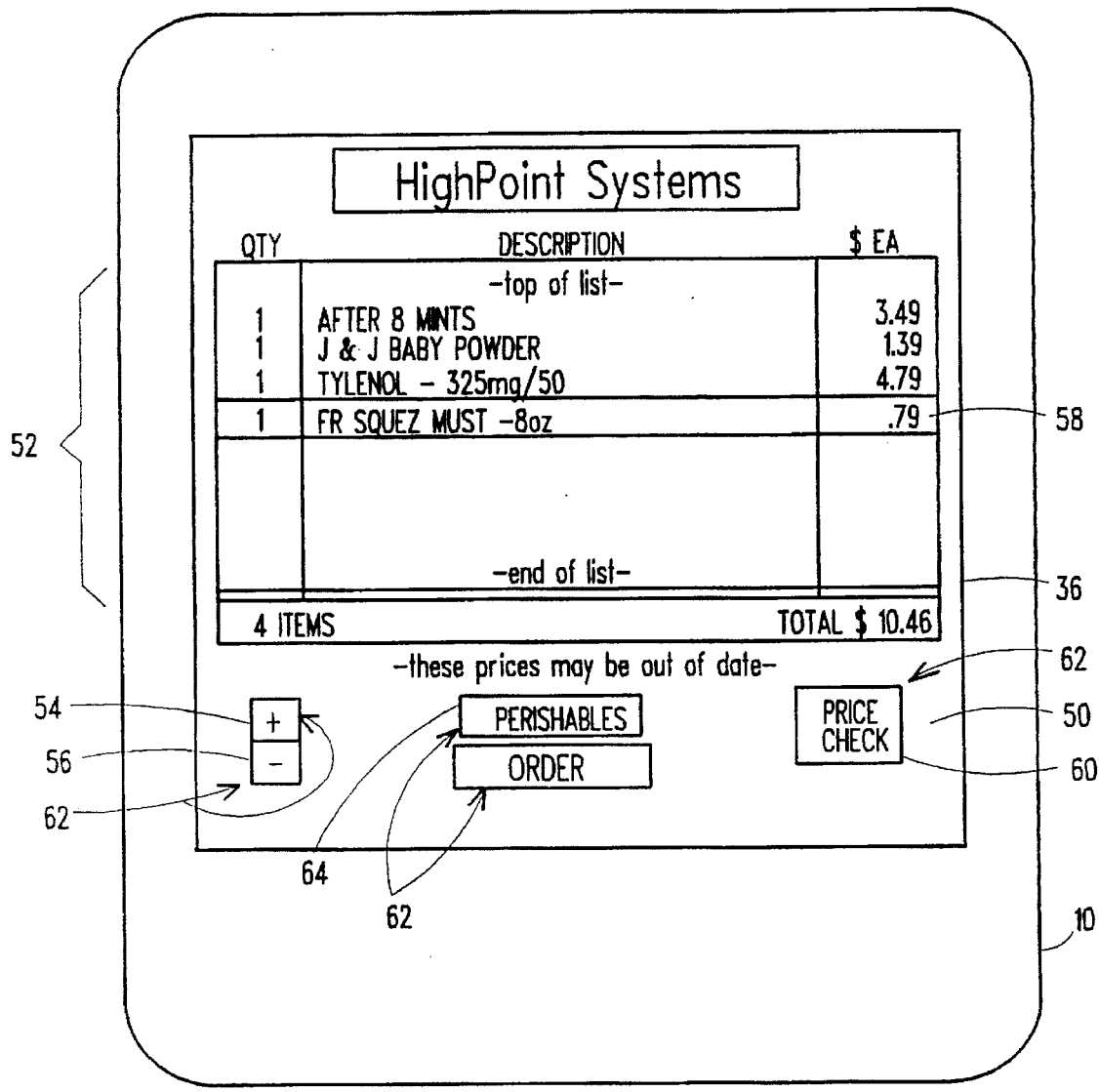
FIG. 3 is a view of a first screen display on a display/processor unit (DPU) of the system of FIG. 1.

FIG. 3 illustrates a typical order entry screen 50. It is envisaged that the DPU 10 will typically remain in an "ON" state, even when not in use, waiting for an order to be added to an open order list 52, though minimal power will be consumed. No communications link is established between the DPU 10 and the DFTC 12 during the building of an order list. Thus, when a user determines that a particular product is needed, or will soon be needed, a user must only input a desired product identifying code such as by scanning the wand 20 across a bar code. In one embodiment of the DPU 10, a screen saver function may be implemented which blanks the display 36 after a predetermined amount of idle time. Thus, it is preferred that the DPU 10 is "ON" and has an order list on the display 36 at an initial step 200 in FIG. 11.

In the illustrated embodiment of FIG. 3, once an item has been added to a current product order list 52, response icons 62 are provided along the bottom of the display 36, though it is understood that the icons 62 could be disposed in other locations within the display 36. The icons 62, also referred to as command entry devices 35, are virtual buttons provided on the display 36 and are responsive to touch from a finger or stylus, or to light from a light wand (depending upon the embodiment of the display 36), and in the illustrative embodiment include increment/decrement icons 54, 56 for adjusting the listed quantity associated with a highlighted item 58. Activation of the icons 62 is represented at steps 202 and 204 of FIG. 11.

As illustrated in steps 206, 207, 208, 209, 210, 211, 212 and 213, an item is added to the order list 52 by scanning the product code. If the item is not on the order list 52 already, a user-discernable description of the item is entered onto the bottom of the list 52 if such description exists with the database, and the description becomes the highlighted item 58. In the alternative embodiment as described above, a unit price taken from the database in the memory 34 also appears within the order list 52. The order cost total is then updated. Note that while not illustrated, the DPU 10 is capable of calculating applicable sales tax and adding this amount to the total cost. Flags associated with each product in the database in RAM 34 would provide an indication to the DPU 10 that the item is subject to local sales tax. Note further that if all items on the current order list do not have corresponding user-discernable descriptions and associated prices, no total will be calculated at step 210.

An item already on the order list 52 can also become the highlighted item 58 by manipulation of arrow icons or keys (not illustrated) disposed proximate the response icons 62 or fabricated on the DPU 10 housing, or by activating the product description of the item on a touch sensitive or electro-optical display 36. Highlighting an item already on the order list 52 as described, followed by activating either the "+" icon or the "−" icon, causes the quantity ordered to increment or decrement. Alternatively, scanning the highlighted item causes the quantity ordered to increment. Once incremented, the total cost is updated based upon the number of incremented items and the unit cost per item. This description of how a product is added to an order list 52 assumes that a user-discernable description corresponding to an input product code exists in the DPU 10 database, and is represented schematically by steps 220 and 226 of FIG. 12.

Figure 11:
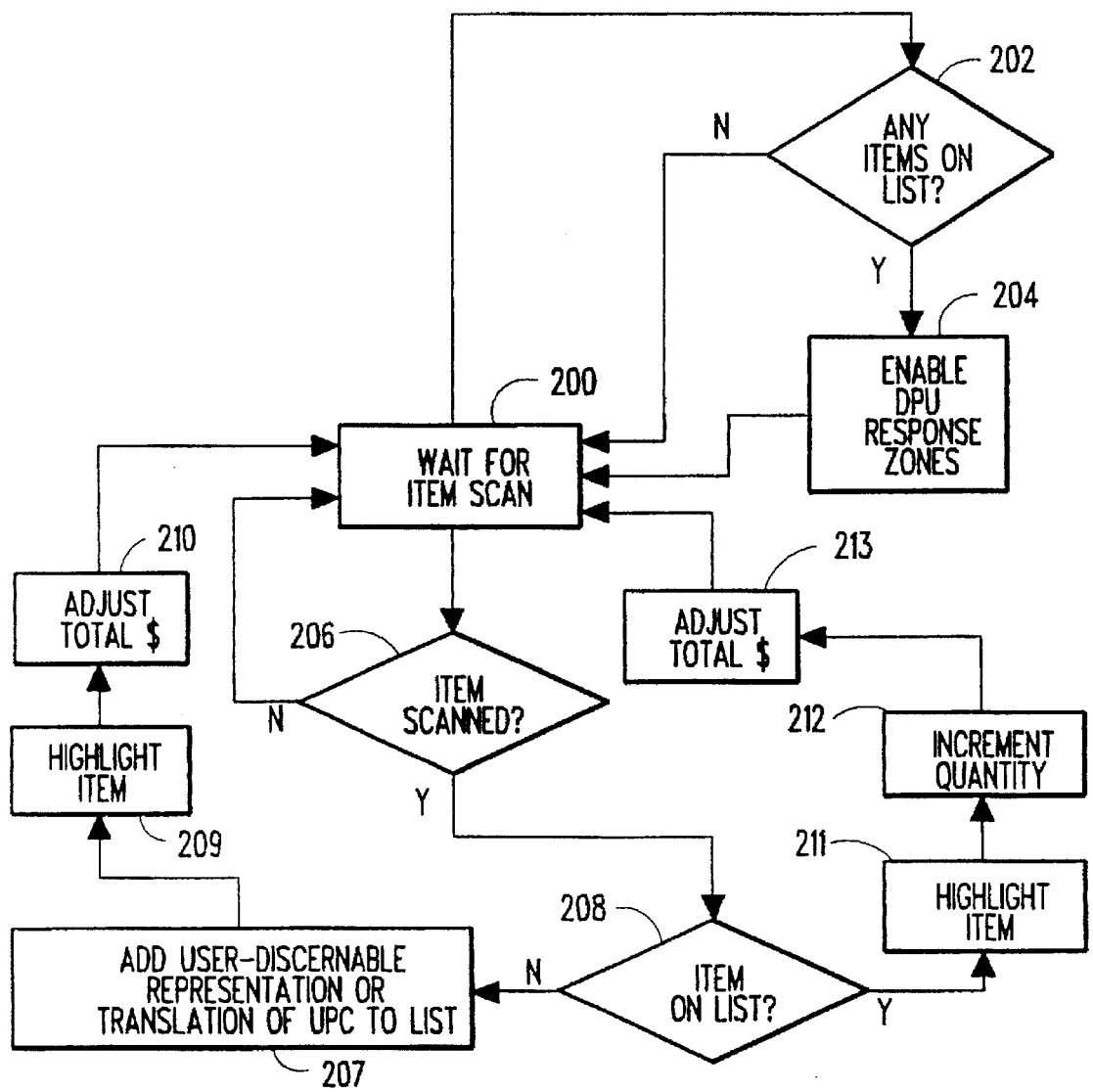
FIG. 11 is a flow chart representation of a product input function of the system of FIG. 1.
Figure 12:
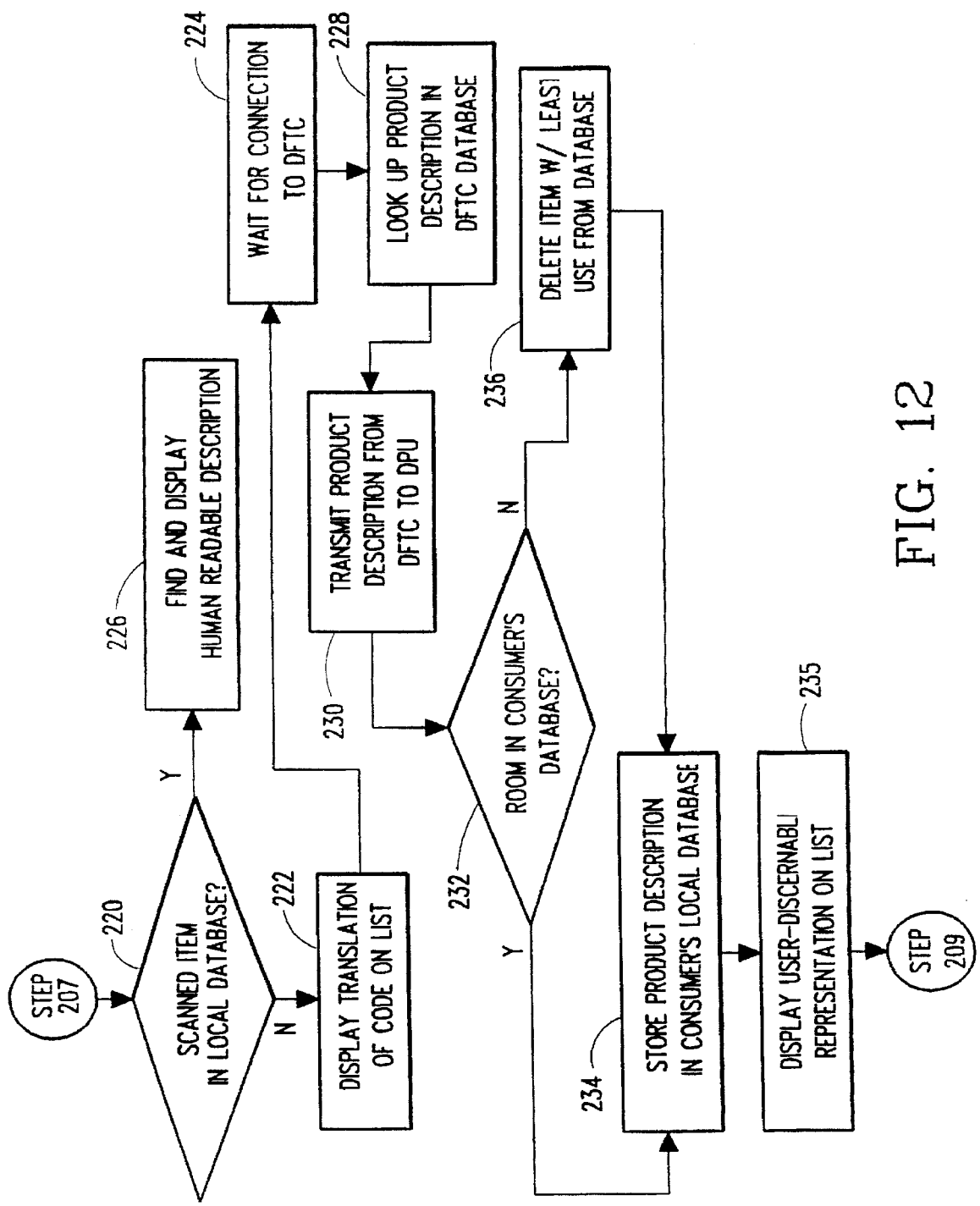
FIG. 12 is a flow chart representation of a database update function of the system of FIG. 1.

In the case where the desired item is not in the DPU 10 database, step 207 of FIG. 11 would further include steps 220, 222, and 224 of FIG. 12. Having scanned such an item, the DPU 10 provides a translation of the scanned code in place of a user-discernable product description in the display 36. No unit price is displayed. Note also that only this translation of the scanned code is derivable from the scanned code. The translation is distinct from the user-discernable representation of the scanned product provided by the DPU 10 database, the latter being in no way directly derivable from the product code. The translation remains in the order list 52 until communication between the DPU 10, DFTC 12, and merchant database 14 is initiated.

Once such a DPU 10 to DFTC 12 communication has been initiated, each ordered product or service placed on the order list being compiled not having a user-discernable representation in the local DPU 10 database is scanned for in DFTC memory. The associated user-discernable representation is then returned by the DFTC 12 to the DPU 10 for storage within the DPU 10 database in RAM 34.

In the alternative embodiment of the present invention in which unit price data is available to the user, activation of a price inquiry icon 60 also causes the DFTC 12 to return a user-discernable product description and current unit price from the merchant database 14 to the DPU display 36 for those items having a translation of the respective item code on the display 36 and not having a user-discernable product description in the DPU 10 database, as indicated in steps 228, 230, 232 and 234 of FIG. 12. This product description and price information will also be added to the DPU 10 database in RAM 34. Of course, such information cannot be supplied if the product is not found within the merchant database 14 or the DFTC 12. If not found within the DFTC 12, communication is initiated between the DFTC 12 and the merchant database 14 to provide such information.

In a further alternative embodiment of the ordering system according to the present invention, the user can request nutritional information on one or more items found on a current order list. In place of or in addition to the price inquiry icon 60, the DPU 10 may provide a nutritional information icon (not shown). As with the price inquiry icon 60, information pertaining to a highlighted product will be returned from the DFTC 12. The user can further be provided with the ability to request nutritional information on other items on the order list at that time, or on comparable items supplied by the merchant involved in the proposed transaction.

Each time product information is updated via activation of the price inquiry icon 60 or via initiation of an order, a product information access date in the DPU 10 database associated with each item on the order list 52 is updated along with any new product identification and unit price information provided by the merchant database 14, as noted in step 230 of FIG. 12. In a first embodiment, if insufficient memory space exists within the DPU database to add a new product description and associated unit price, or if a predefined maximum size for the DPU 10 database would be exceeded by adding this new information to the database, the CPU 30 determines the oldest, or least accessed, product information based on access date. This oldest information is aged out, or deleted, from the database until sufficient room exists within RAM 34 to substitute in the new product information, as indicated in steps 236 and 234 of FIG. 12. This creation of space within RAM 34 is referred to as database "aging". Once the user-discernable information is stored within the DPU database, it can be displayed within the displayed list, as indicated by step 235 of FIG. 12.

In another embodiment, the CPU 30 can automatically age out information based upon frequency of use. Further, products or services can be organized within classes, with each class having its own aging parameters. Alternatively, the present invention can rely upon user intervention for decisions as to which information should be deleted from memory.

Other response icons 62 include the price inquiry icon 60 in an alternative embodiment. Since the DPU internal database within RAM 34 can contains product prices as of the date of the last order or price inquiry, a user may wish to determine the most up-to-date unit prices. Activating this icon 60 initiates communication between the DPU 10 and the DFTC 12, the latter providing the desired unit prices for all of the items on the order list 52. A more detailed description of the steps involved in the initiation of the communication between the DPU 10 and the merchant database 14 is provided in conjunction with the discussion of FIG. 13, below.

Another response icon 62 which can be provided to a user via the DPU display 36 is an option list icon 64. In the embodiment illustrated in FIG. 3, this option list icon 64 is labelled "PERISHABLES" and when activated provides a list of frequently ordered perishables taken from the DPU internal database within memory 34. In an alternative embodiment, activation of an option list icon 64 invokes communication between the DPU 10 and the merchant database 14 via the DFTC 12. The merchant database 14 is prompted by the DFTC 12 for an option menu, containing names of sub-menus available, provided to the user at the DPU display 36. For instance, if the merchant is a grocery store, the option menu can include sub-menus labelled "butcher counter", "delicatessen", "fruits", "vegetables", etc. Selection of one of these sub-menu options would result in a menu of products (and associated unit prices in the alternative embodiment) appropriate to the chosen sub-menu.

In a further embodiment of the present system, the user can scan a bar code or other machine readable code, as appropriate to the data entry device 16 or command entry device 35, in order to invoke such sub-menus. For example, the user may wish to order butter, but may not know which brand is most suited to the user's needs. By scanning a bar code labelled "butter" on a printed menu, a sub-menu similar to those described above can be displayed, providing the user with a range of butter products to choose from. Of course, this embodiment is equally applicable to other products or services, depending upon the application for the system.

Figure 4:
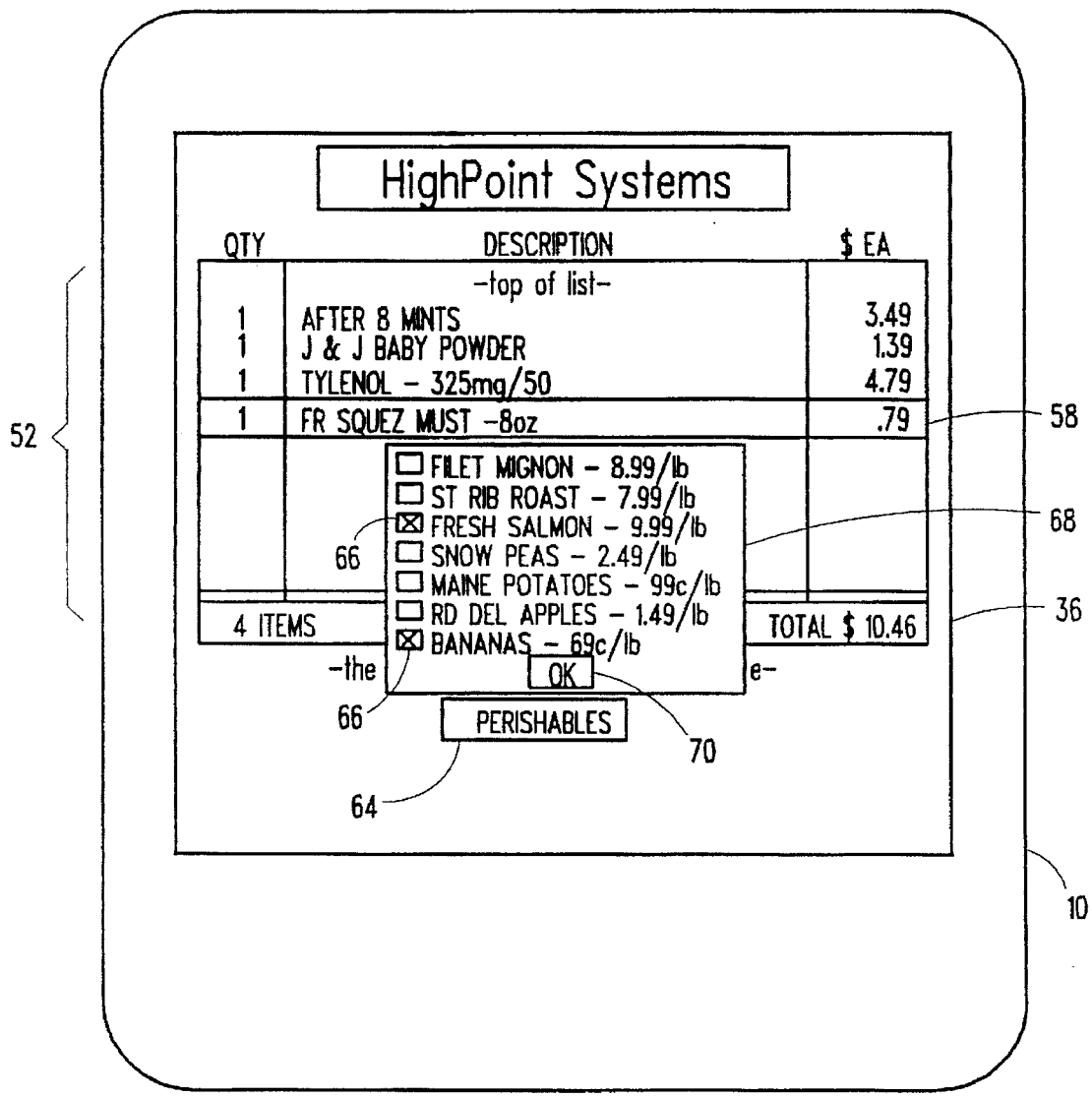
FIG. 4 is a view of a second screen display on a DPU of the system of FIG. 1.

In FIG. 4, a general list of perishables has been requested. This display can be the result of activation of the option list icon 64 labelled "PERISHABLES" in FIG. 3, and can be the result of a suggested or typical shopping list provided by either the merchant during programming of the DPU 10 or by the supplier of the DPU 10. Alternatively, the user can create its own custom list to be displayed upon selection of the appropriate icon from an option list.

Figure 5:
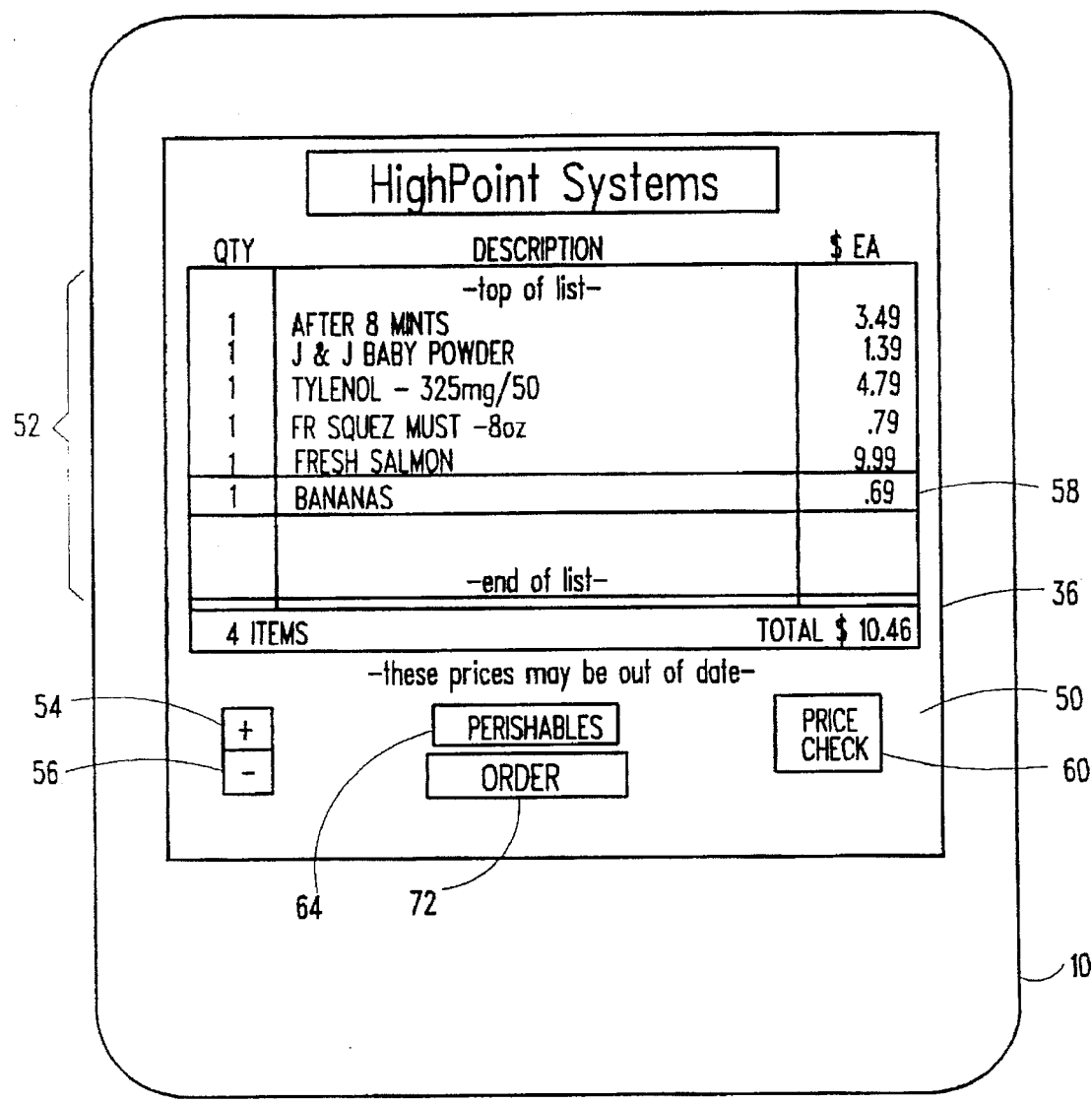
FIG. 5 is a view of a third screen display on a DPU of the system of FIG. 1.

In the exemplary embodiment of FIG. 4, the user has chosen two items from this option list 68 of perishables, including "FRESH SALMON" and "BANANAS" as indicated by an "X" in icons 66 associated with these items. Again, these icons 66 can be touch-sensitive or electro-optical. Once the user is satisfied with the selections made from this option list 68, the "OK" icon 70 is activated and the chosen items are added to the currently active order list 52, as shown in FIG. 5. Note that the highlighted item 58 in the order list 52 is now the last item from the option list 68 in FIG. 4.

Once an order list 52 is complete and a user wishes to place an order with a merchant, an "ORDER" response icon 72 is activated. Note that this icon 72 can be otherwise labelled and located. This initiates communication between the DPU 10 and the DFTC 12, which typically has access to a number of merchant databases 14 as depicted in FIG. 2, and as represented by step 240 in FIG. 13. Note that the sequence of steps taken in establishing communication between the DPU 10 and the DFTC 12 is identical to the sequence of steps initiated by activation of the price inquiry icon 60 of FIG. 3, as represented by step 242 in FIG. 13.

Figure 6:
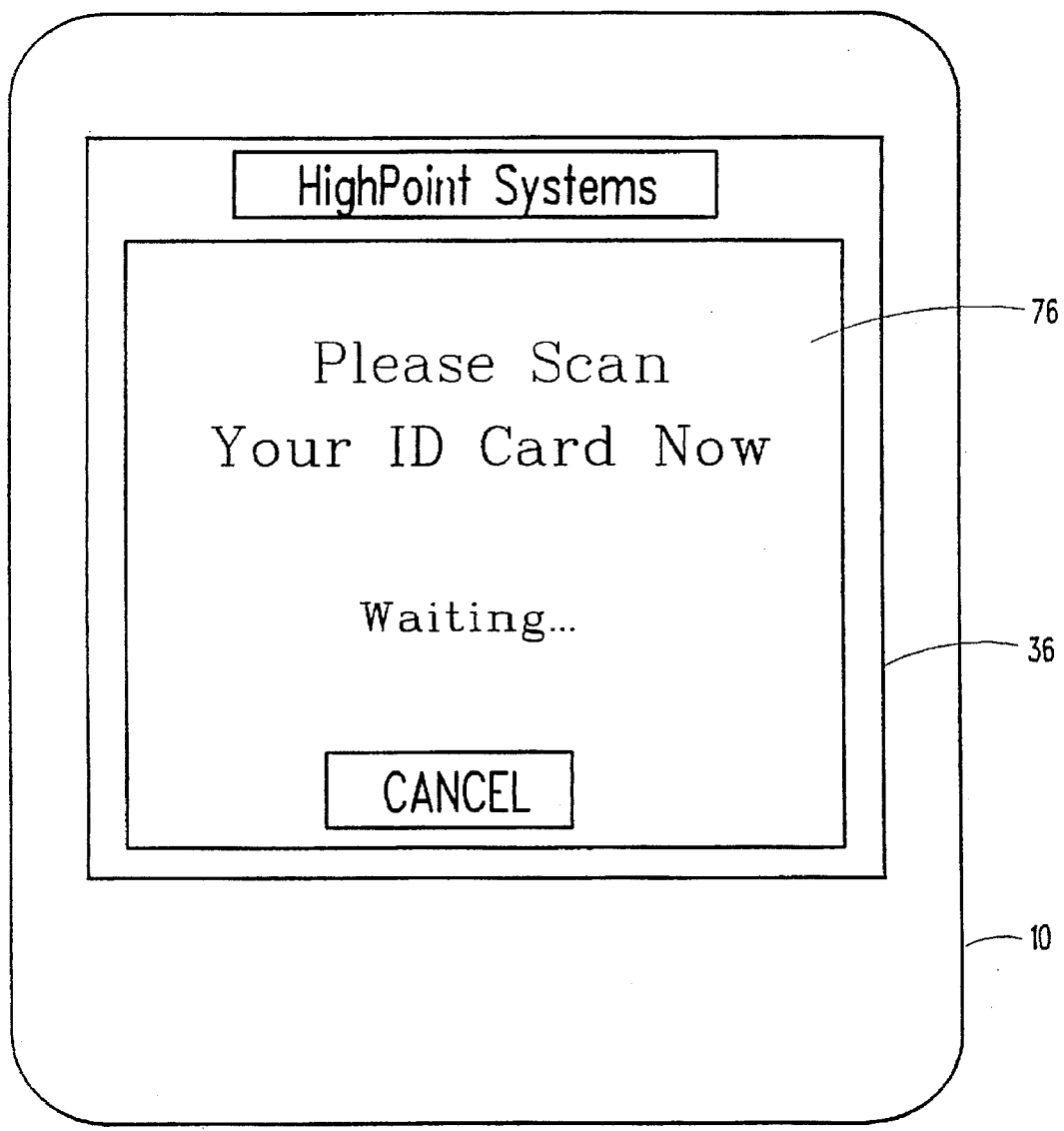
FIG. 6 is a view of a fourth screen display on a DPU of the system of FIG. 1.
Figure 13:
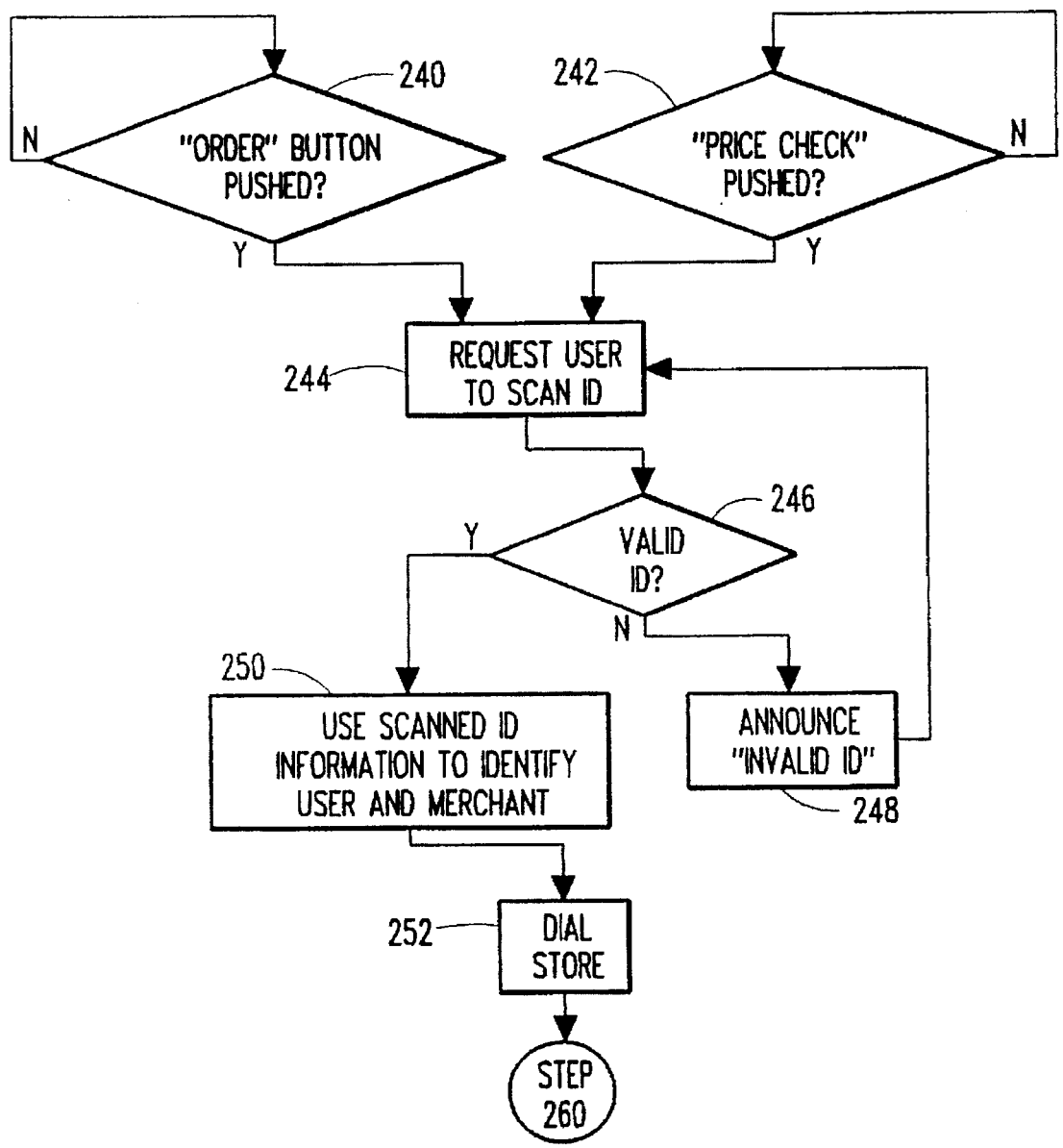
FIG. 13 is a flow chart representation of establishment of a communication link in the system of FIG. 1.
Figure 15A:
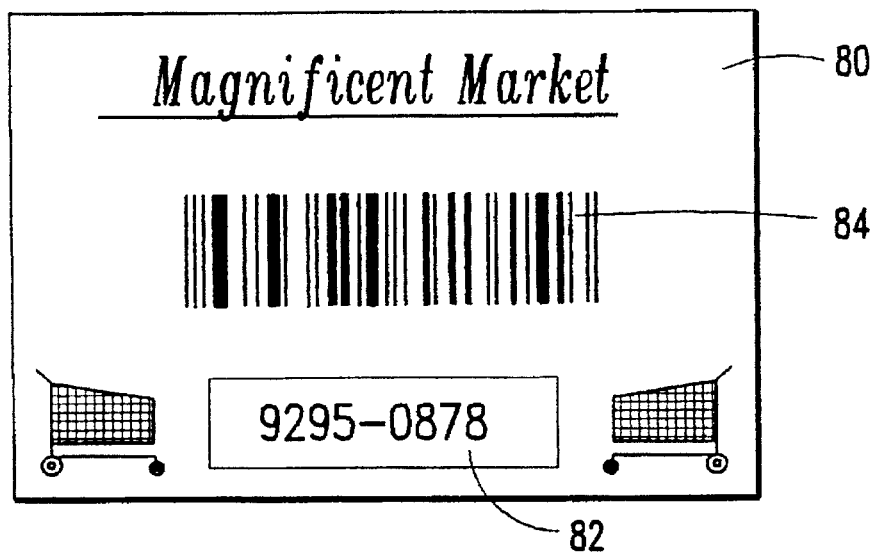
FIG. 15A is a first side view Of a user identification control card employed in the system of FIG. 2.
Figure 15B:
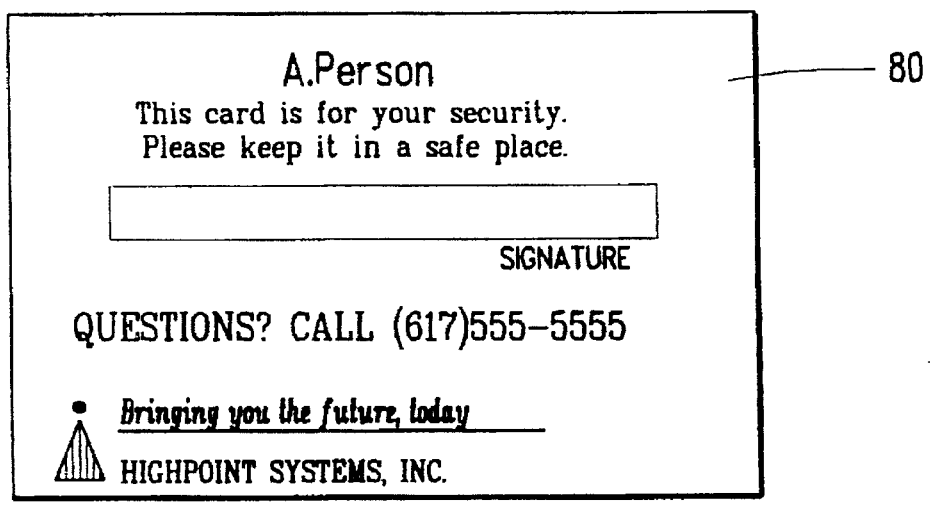
FIG. 15B is a second side view of the user identification control card of FIG. 15A.

In the illustrated embodiment, to determine which of multiple merchants to order from and to determine the identity of the user, the DFTC 12 causes the DPU 10 to provide a prompt screen 76 on the DPU display 36, shown in FIG. 6, represented by step 244 of FIG. 13. Each user has at least one identification control card 80 for each merchant with which the user has a remote ordering account. The identification control card 80, which carries a user number 82, can resemble a credit card, as illustrated in FIGS. 15A and 15B. The identification control card 80 can additionally or alternatively carry a coded representation 84 of the user number 82.

As noted, the user identification control card 80 represents information regarding the merchant to be interfaced with, typically including but not limited to merchant location and account number, and further represents user information such as user name and address, delivery preference, and user profile. Security is thus provided to both the merchant and the user, since only users having valid identification control cards in their possession can initiate an order and charge to a particular account. Additional security means, such as the implementation of a call-back system or use of user-entered PIN numbers, can be incorporated into the present system.

In an alternative embodiment in which DPU 10 access security is not of heightened concern, the DPU 10 can have a code stored within the DPU 10 corresponding to a user's account number, profile, etc. as well as merchant information such as telephone number and address. The desired merchant is then chosen from a submenu of merchants.

Regardless of the means for providing user and merchant information to the DPU 10 and thus to the DFTC 12, such information is provided only in a coded format. For instance, each user has one code assigned to him or her. Merchant account numbers, user profiles, etc. are stored within the DFTC 12, and are accessed by the user code. Similarly, each merchant has a code. All information pertaining to each merchant is similarly stored within the DFTC 12 and can be made available to the user via the DPU 10.

The prompt screen 76 results in input of the user number 82 or the coded representation thereof 84 into the DPU 10. In FIG. 6, the DPU 10 is indicating that the user should pass a scanning wand 20 over the coded representation 84 of the user identification control card 80. The CPU 30 is able to interpret the coded information provided by the identification control card 80 via the data entry device 16 to make an initial determination whether the identification control card is valid, as depicted in step 246 of FIG. 13. If the identification control card 80 is determined to be not valid, a message to that effect is provided to the display 36 for a limited time before the prompt screen 76 is redisplayed, as in steps 248 and 244 of FIG. 13. However, if the validity of the identification control card 80 is confirmed by the CPU 30 as represented by step 250 and 252 of FIG. 13, the DPU 10 uses the identification control card 80 information to identify the merchant database 14 to be interfaced and communicates with the DFTC 12, which in turn accesses the appropriate merchant database 14.

Figure 14:
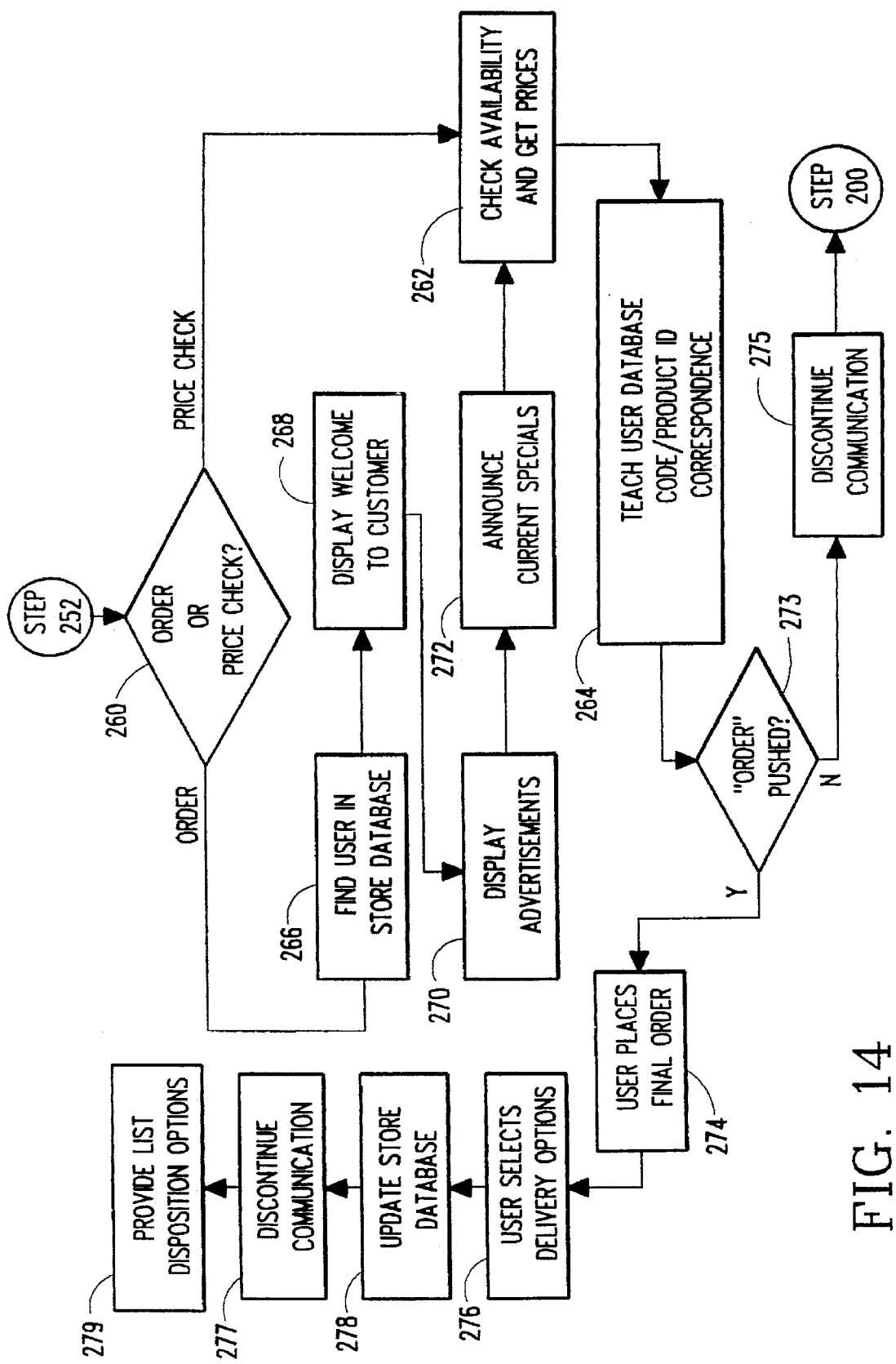
FIG. 14 is a flow chart representation of an interactive session in the system of FIG. 1.

How a merchant database 14 reacts to communication initiated by a DPU 10 depends on whether the communication is a result of a price inquiry (activation of a price inquiry icon 60, FIG. 3) or of an order command (activation of an order icon 72), as shown in step 260 in FIG. 14. As discussed, if a user is merely requesting a price inquiry (step 242), information is requested from the identification control card 80 for identification of the proper merchant database (steps 244 and 250, FIG. 13). The CPU 30 then indicates to the DPTC 12 that availability and price information is being requested for the items in the order list 52 (step 252, FIG. 13 and step 262, FIG. 14). The DFTC 12 searches the merchant database 14 for accurate product description information, unit price, and product availability, and returns this information to the DPU 10. If each product on the order list 52 had previously been ordered, and therefore a user-discernable product description is already associated with the corresponding product code in the DPU database in memory 34 for each product, the relevant product descriptions and unit prices are updated, if necessary, and the access dates are updated. If a user-discernable product description is not in the DPU 10 database and the user has requested a price inquiry, such user-discernable product information, along with current unit price, is initially downloaded to the DPU 10 database. The latter step is referred to as "teaching" the DPU 10 database. This corresponds to step 264 in FIG. 14.

Once all items in the current list have been checked for validity and updated, if necessary, the price inquiry procedure is terminated, and the DPU 10 returns to an item entry state (steps 273 and 275, FIG. 14).

Figure 7:
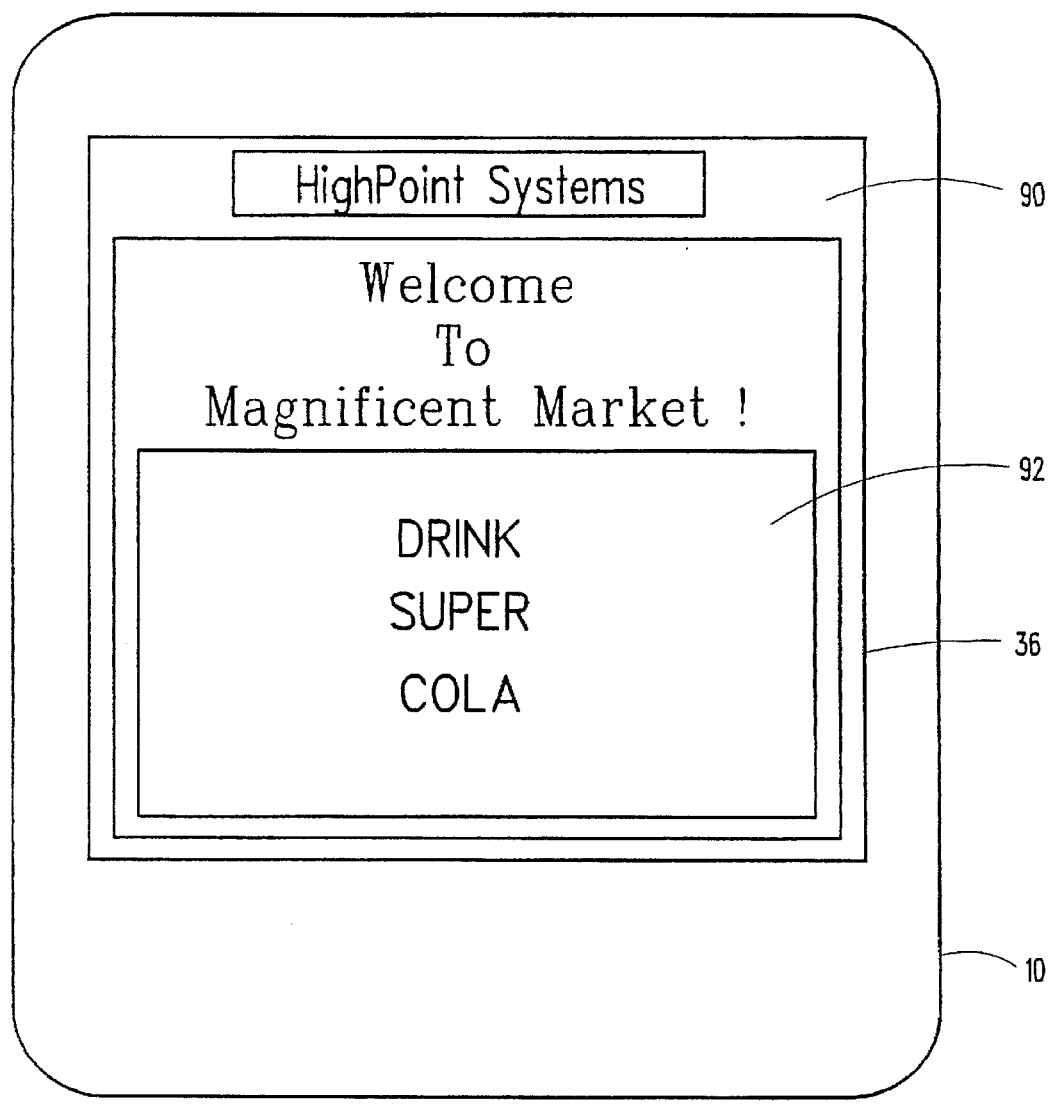
FIG. 7 is a view of a fifth screen display on a DPU of the system of FIG. 1.

On the other hand, if the user has indicated a desire to place an order by activating the order icon 72, several intermediate steps are taken, as illustrated by steps 266, 268 and 270 of FIG. 14. The user is first identified to the merchant database 14 according to the information provided by the scanned identification control card 80, as shown in FIG. 13. If there is nothing barring trade with this user, a greeting screen 90 can be provided on the DPU display 36, as illustrated in FIG. 7. The greeting screen 90 can be customized according to the merchant, and can include general information such as hours of operation, store locations, or advertising in a portion 92 of the DPU display 36. Alternatively, user specific information can be provided, including account status, availability of frequently ordered products, or other personalized messages. The greeting screen 90 can remain on the display 36 for a preprogrammed time, or can remain displayed until the user takes some action, including activation of a response icon similar to those in FIG. 3.

Figure 8:
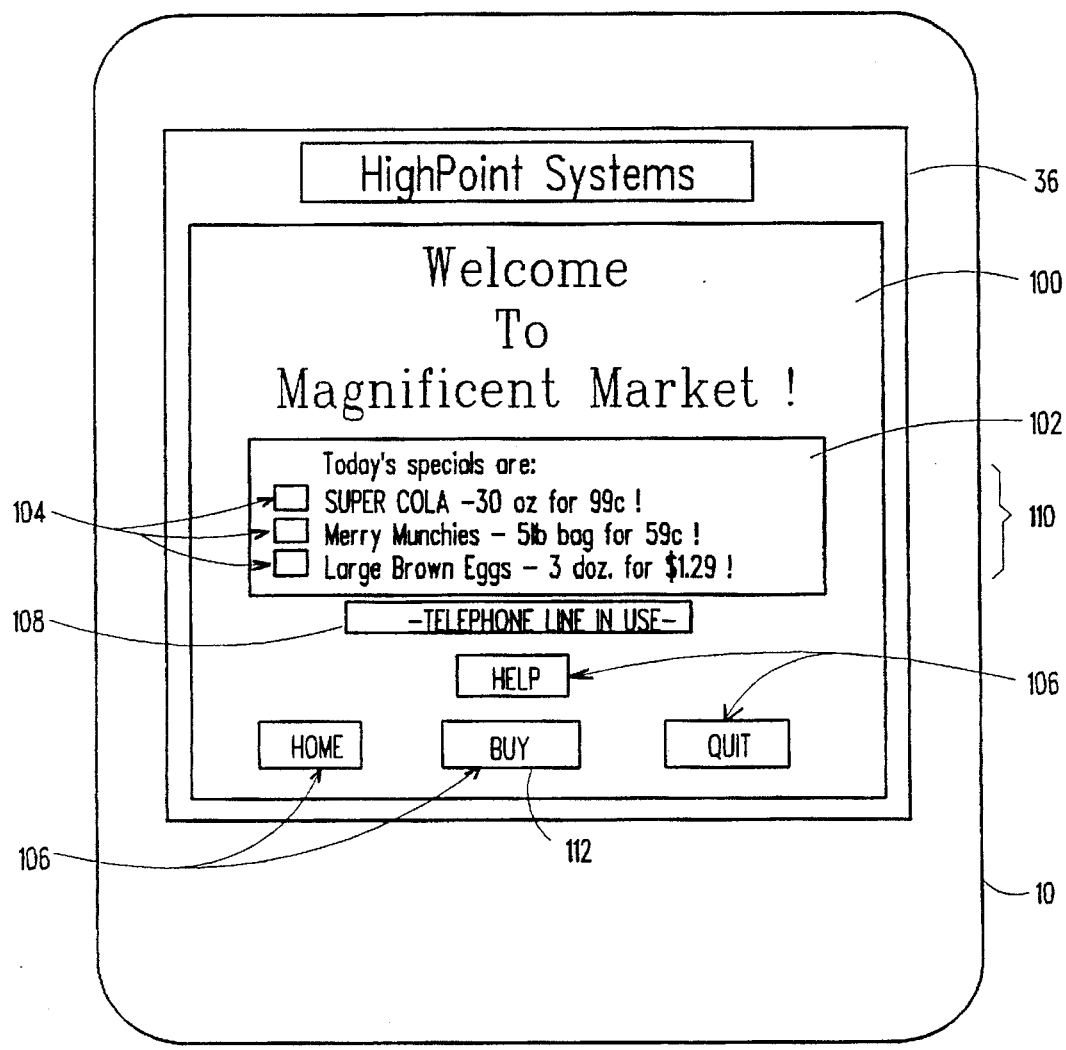
FIG. 8 is a view of a sixth screen display on a DPU of the system of FIG. 1.

A promotional screen 100 can be provided to the user as depicted in FIG. 8 and as represented by step 272 of FIG. 14. This screen 100 illustrates the ability to inform the user of special promotions which the merchant is offering. As shown, a window 102 of promotional items 110 provides both information regarding the items 110, as well the opportunity for the user to add these items 110 to the present order list 52. Icons 104 associated with the promotional items 110 enable such order list 52 addition. Other response icons can be provided to give the user various options regarding the purchase of the promotional items 110.

Promotional screens 110 such as the one illustrated in FIG. 8 can be the result of merchant database 14 providing the DFTC 12 with specials to be advertised for a given period. In this case, the merchant database 14 provides advertising information to the DFTC 12 on a regular, periodic basis. In another embodiment of the present system, advertising information is provided to the DFTC 12 when the DFTC 12 contacts the merchant database 14 as a result of either a price inquiry or an order command. The advertising prompted by the merchant database 14 can be either generic in nature, that is, applicable to all users, or can be customized to the individual buying patterns of the user in question.

Also shown in FIG. 8 is a reminder indication 108 which informs the user that the DPU modem 38 is presently in communication with the DFTC 12 using the user's telephone line. As with other messages provided to the DPU display 36, this reminder indication 108 can be in reverse video, and can be blinking on and off at a rate chosen to gain the attention of the user. While not shown in other illustrative screens provided to the user during telephonic communication between the DPU 10 and the DFTC 12, this or an analogous message may be employed somewhere on the DPU display 36.

After the promotional screen 100, the user can be provided with another opportunity to review the items compiled in the present order list via a screen similar to that illustrated in FIG. 5. This is of particular use if one or more items on the list were not previously in the DPU internal database. In such case, the user would have been provided with a numeric representation of the input product code prior to communication with the merchant database 14. After communication, a user-discernable representation of the product code would be substituted into the order list 52, thus enabling the user to confirm an order of the item. These user-discernable representations will also be entered into the DPU database within RAM 34 for future use, as indicated by steps 262 and 264 of FIG. 14.

Similarly, the unit price for items in the order list is updated according to current prices as provided by the merchant database 14 to the DFTC 12, both on the DPU display 36 and in the DPU internal database in RAM 34.

Figure 9:
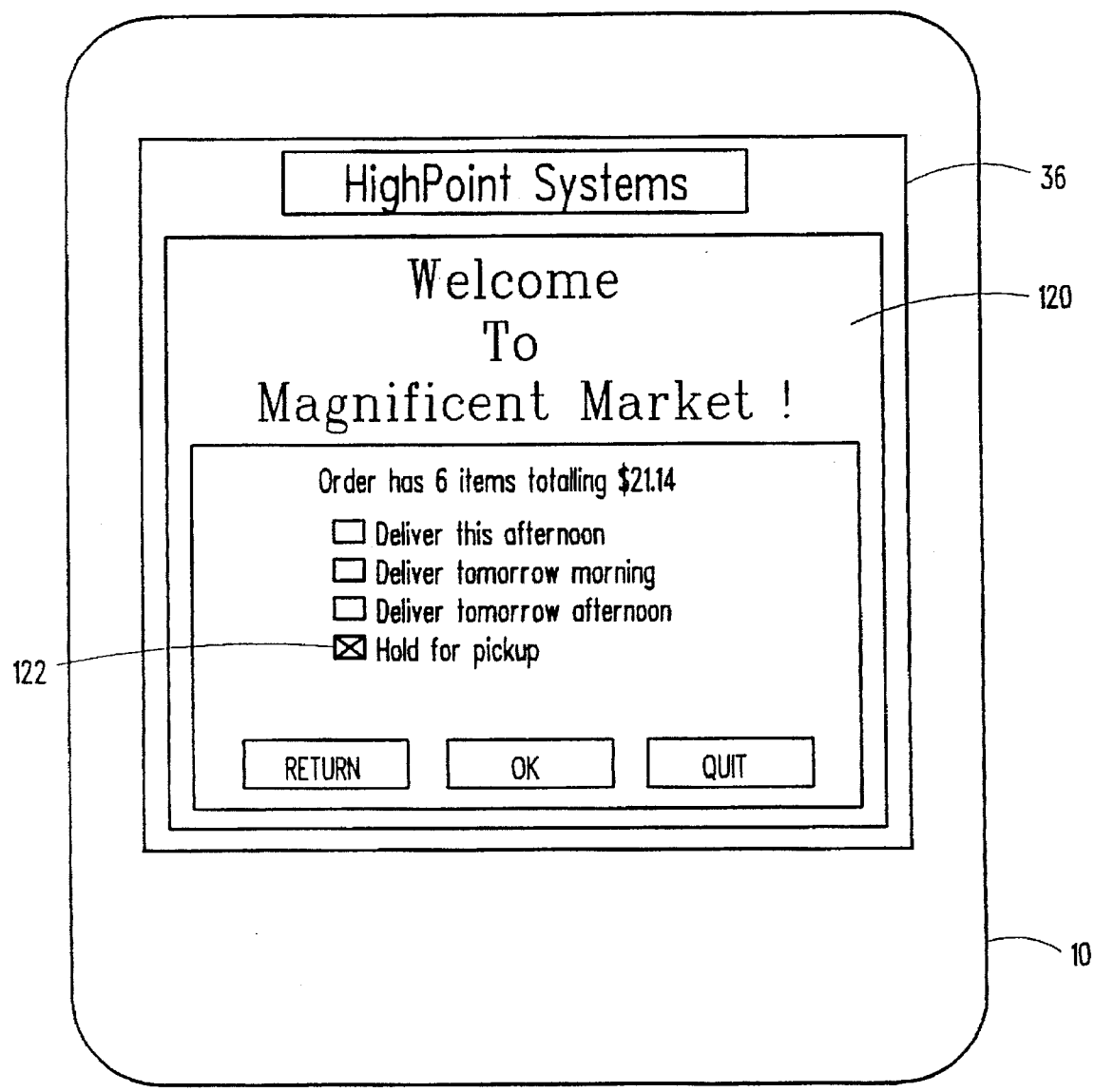
FIG. 9 is a view of a seventh screen display on a DPU of the system of FIG. 1.

Once the order list has been reviewed and confirmed, the user can command the DPU 10 to execute the order, as in steps 273 and 274 of FIG. 14. This can be done by user activation of a response icon 62 such as the icon 72 labelled "ORDER" in FIG. 5, or by activation of other similarly labelled response mechanisms. The DPU modem 38 conveys the execution order to the DFTC 12, which can then provide the user with option screens such as a delivery option screen 120, shown in FIG. 9 and step 276 of FIG. 14. The user is thus provided with the opportunity to specify how the ordered products are to be conveyed. In FIG. 9, the user has activated a response icon 122 directing that the order be held for pick-up. The order list is then provided to the merchant from the DFTC 12 telephonically via voice, in hard copy, on magnetic media, or telephonically via a modem. It is further envisaged that the order list is conveyed electronically to the merchant such that the merchant is able to update the merchant's inventory control system automatically based on the order list.

Figure 10:
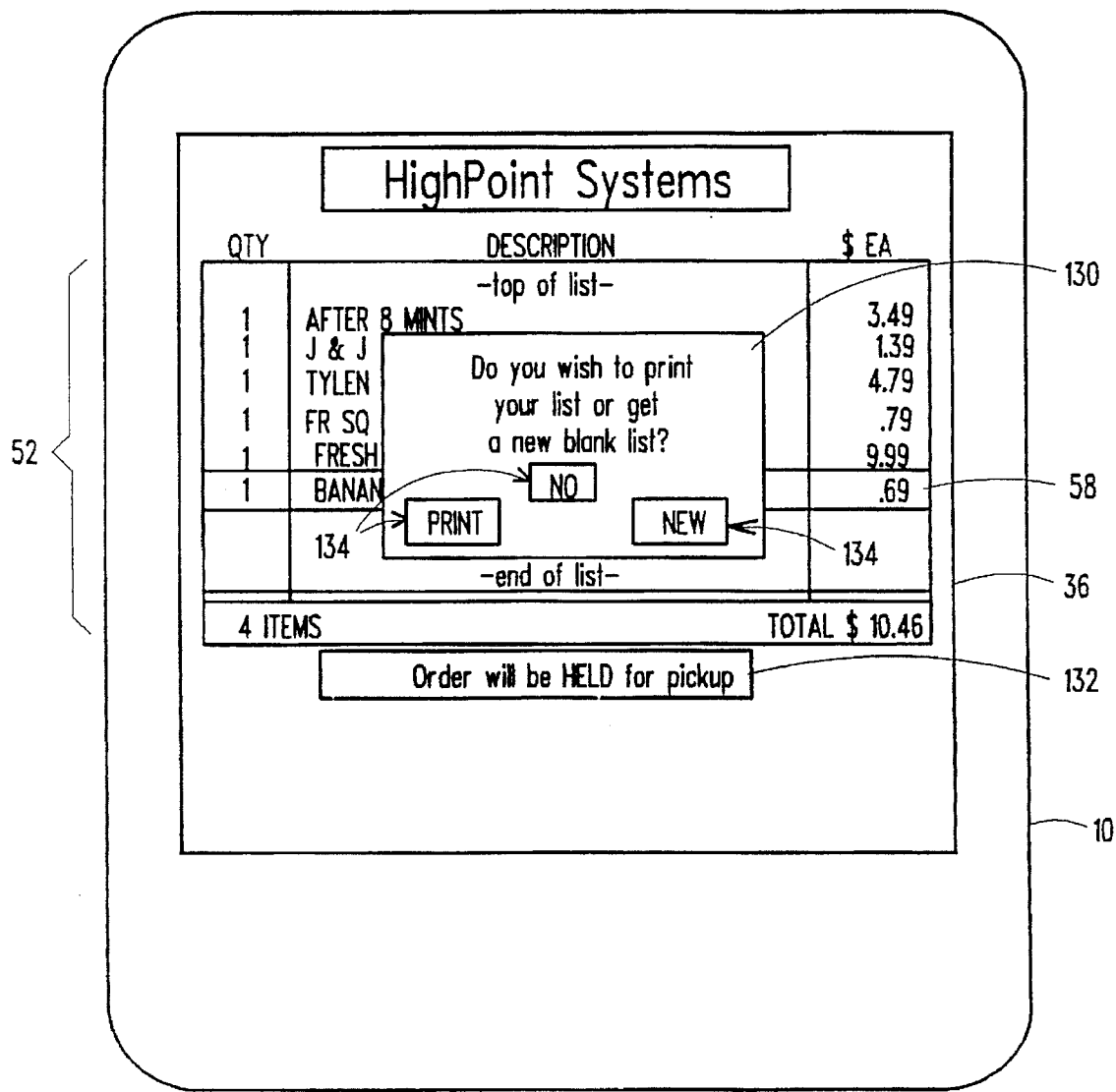
FIG. 10 is a view of a eighth screen display on a DPU of the system of FIG. 1.

Once the user has responded to whatever option screens are provided, depending upon the configuration of the ordering system, telephonic communication between the DPU 10 and the DFTC 12 is terminated, as in step 277. From the point of view of the user, a final step in the ordering process can be a list disposition option screen 130, as shown in FIG. 10. This screen 130 provides the user with the ability, through the use of response icons 134, to print the current order list 52, to generate a new blank order list, to return to the order list 52 just completed, or to store the order list 52 within RAM 34, as reflected in step 279 of FIG. 14.

In an alternative embodiment, the list disposition option screen 130 can provide the user the opportunity to store the current option order list 52 as one of several user selectable order lists. Such an alternative embodiment can further provide the user the ability to recall one of several stored order lists. An option menu can provide a textual description of stored order lists available, or such stored lists can be made available via descriptive icons.

From the point of view of the merchant database 14, the final step in the ordering process, as reflected in step 278 of FIG. 14, is to update the merchant database 14 to reflect the user order just processed. Thus, in addition to providing a convenient way for a user to compile and order a list of needed products, the present system enables automated maintenance of merchant inventory.

The foregoing description of the remote ordering system according to the present invention has been described with reference to an individual user ordering products, specifically groceries. It should be understood that the present system is in no way limited in product applications to a single user ordering groceries. Rather, the user can be multiple employees of a commercial customer, and the products being ordered can be regularly ordered items such as office products. Further, there is no limitation to products; the present system can also be employed to order services from a variety of sources. Examples of products and services which can be ordered using the present invention include video rental, dry cleaning and laundry, snow removal, lawn mowing, prescriptions, and overnight delivery services.

The greeting screen 90, the promotional screen 100, and the delivery options screen 120 have each been described as discrete screens to be sequentially provided on the DPU display 36. However, it is understood that one or more of these screens may be combined with other displayed information in order to provide some or all of the referenced information and capabilities to the user in other combinations.

The physical embodiment of the ordering system of the present invention has been described as a DPU 10 having various user activated response icons or command entry devices 35 located within the display 36, such as the icons 104, 106 illustrated in FIG. 8 and the icons 134 illustrated in FIG. 10. It has been noted that these icons can be provided as IR touch-sensitive, electrically conductive touch-sensitive, or electro-optically responsive. The function of the response icons or command entry devices 35 can also be performed by software programmable function keys disposed about the periphery of the DPU display 36. However, in order to minimize DPU 10 unit cost and to simplify the appearance and operation of the DPU 10, response icons such as those referenced above are preferred.

In an alternative embodiment to the DPU 10 as illustrated in and discussed with respect to FIG. 2, the DPU 10 is a dumb terminal which must be in communication with the DFTC 12 in order to provide user-discernable representations of scanned items. Thus, the database of such representations is found within the DFTC 12, rather than in the DPU 10 RAM 34. In such a configuration, database updating can be executed upon scanning an item at a DPU 10, at a regular interval with each or selected merchants, or at the time of execution of an order, price inquiry, or request for nutritional information.

In a further alternative to the embodiment described above, it is envisaged that the system of the present invention can be responsive to a bar code or other machine readable code such that a number of items are added to an order list currently being constructed. For instance, a recipe can have an associated bar code printed with it. Once scanned, the bar code is used to locate a number of products associated with the scanned code representing various ingredients needed for the preparation of the recipe. The user can then determine if any of the ingredients are on hand and can thus be removed from the list prior to commanding an order. Note that the ingredients are added to the displayed list in user-discernable format. Thus, the list of contents for each recipe is treated as an individual item by the DPU 10, described above. If the recipe has not been "learned" by the DPU 10 database in RAM 34, the DPU 10 will communicate with the DFTC 12 in order to learn the ingredients of the recipe. If the database is too full to learn the recipe ingredients, the database will "age-out" the earliest stored and least used item or recipe, as described above. Of course, this alternative embodiment for the present system can be applied to other products and services, depending upon the nature of the goods ordered via the DPU 10, and is not limited to recipes.

These and other examples of the concept of the invention illustrated above are intended by way of example and the actual scope of the invention is to be determined from the following claims.

What is claimed is:

1. A remote ordering terminal for providing at least one list of at least one item or group of items to a remotely located order processing system associated with one or more merchants on each of a plurality of occasions, each item or group of items having an item code associated therewith, said remote ordering terminal comprising:

user and/or merchant identifier means;

at least one data entry device for providing said terminal with said item associated item codes and with data from said user and/or merchant identifier means;

a database unit providing a user-specific database including user-discernable item data associated with item codes for user-selected items or groups of items;

memory to provide storage for said user-specific database, said memory in communication with said at least one data entry device for storing said at least one list;

communication means for associating said memory and said order processing system upon user command for remotely accessing said order processing system over a multi-user network, for transmitting said at least one list to said order processing system using said data from said user and/or merchant identifier means, and for receiving new and/or replacement user-discernable item data from said order processing system during association of said memory and said order processing system, said new and/or replacement user-discernable item data corresponding only to said at least one item or group of items of said at least one list;

a message display portion in communication with said memory and said user-specific database for displaying order pertinent information including said user-discernable item data from said memory; and at least one command entry device responsive to user selection of items from said order pertinent information for assembling said at least one list and for enabling said user command, resulting in said transmitting of said at least one list to said order processing system, wherein said at least one list is comprised of an order to be processed by said order processing system, or a provisional order list transmitted to said order processing system, transmission of either resulting in on-demand receipt of said new and/or replacement user-discernable item data within said user-specific database for said at least one item or group of items.

2. The terminal according to claim 1, wherein said identifier means comprise data necessary for accessing said order processing system by a user including user account number.

3. The terminal according to claim 2, wherein said identifier means are disposed within said remote ordering terminal memory.

4. The terminal according to claim 3, wherein said identifier means are selectable by said user from a list of said identifier means stored within said remote ordering terminal memory.

5. The terminal according to claim 2, wherein said identifier means are disposed external to and independent from said remote ordering terminal memory.

6. The terminal according to claim 1, wherein said at least one data entry device comprises bar code detection and analysis circuitry.

7. The terminal according to claim 1, wherein said identifier means are selectively associated with said at least one data entry device for machine recognition of said identifier means.

8. The terminal according to claim 1, wherein said at least one data entry device is selected from a group consisting of a keyboard, a keypad, a magnetic stripe reader, and a voice recognition circuit.

9. The terminal according to claim 1, wherein said memory is random access memory.

10. The terminal according to claim 1, wherein said memory further stores at least one previously user-compiled list.

11. The terminal according to claim 1, wherein said user-discernable database is stored within said memory.

12. The terminal according to claim 1, wherein said terminal further comprises a processor in communication with said memory, said at least one data entry device, said communication means, said user-specific database, said message display portion, and said at least one data entry device.

13. The terminal according to claim 1, wherein said user-discernable item data includes nutritional data applicable to a corresponding item code.

14. The terminal according to claim 1, wherein said user-discernable item data includes a pictorial representation of an item having a corresponding item code.

15. The terminal according to claim 1, wherein said order pertinent information includes promotional information provided by said order processing system to said remote ordering terminal via said communication means.

16. The terminal according to claim 1, wherein said at least one command entry device and said message display portion collectively comprise a touch-sensitive display disposed within said remote ordering terminal.

17. The terminal according to claim 1, wherein said at least one command entry device is selected from the group consisting of a mouse, a light pen, a trackball, and an air mouse.

18. The terminal according to claim 1, wherein said at least one data entry device and said at least one command entry device are the same at least one device.

19. The terminal according to claim 1, wherein said command entry device comprises at least one function key disposed within said remote ordering terminal.

20. The terminal according to claim 1, wherein said memory comprises a removable media interface for interfacing removable media.

21. The terminal according to claim 20, wherein said user-specific database is stored within said removable media.

22. A method for remote ordering at least one desired item by a user from one of a plurality of merchants using a system having a user device, a central computer, one of a plurality of merchant databases, and a communications link including a multi-user network, said at least one desired item having a unique identifying code associated therewith, the method comprising:

storing for a plurality of user-specific items, in an identifier database accessible at said user device for user perception at said user device, a user-cognizable identifier of said at least one item corresponding to said identifying code;

user inputting said identifying code corresponding to said at least one desired item into said user device by machine recognition of said user input identifying code;

accumulating from said identifier database selected ones of said user-cognizable identifiers corresponding to said input identifying codes in at least one list of desired items;

selectively associating a transaction identifier having user and/or merchant identifications with said user device to identify a selected merchant database and/or to identify said user to a selected merchant database;

commanding said user device to establish remote communication between said user device and said selected merchant database corresponding to said merchant identification through said central computer over said communications link including said multi-user network;

interactively updating only said selected one of said user-cognizable identifiers in said identifier database of user-specific items with current information provided by said merchant database over said communications link in response to a user action at said user device, said user action including the communication of a provisional list of desired items transmitted to said selected merchant database for the purpose of providing said interactive updating, or the communication of an order list of desired items transmitted to said selected merchant database for the purpose of providing said interactive updating and remote ordering said desired items comprising said order list; and passing transaction specific information over said communications link including said identifying codes between said user device and said selected merchant database.

23. The method according to claim 22, wherein said step of user inputting said identifying code includes scanning said identifying code with a bar code reader in communication with said user device.

24. The method according to claim 22, wherein said step of user inputting said identifying code includes user inputting said identifying code corresponding to a plurality of unique products.

25. The method according to claim 22, wherein said step of user inputting said identifying code by machine recognition includes the processing of a scanned bar code by bar code detection circuitry.

26. The method according to claim 22, wherein said step of user inputting said identifying code by machine recognition includes the processing of input data from an element selected from the group consisting of a keyboard, a keypad, a magnetic stripe reader, and a voice recognition circuit.

27. The method according to claim 22, wherein said step of accumulating from said identifier database selected ones of said user-cognizable identifiers in said at least one list further comprises the step of reviewing said at least one list including said user-cognizable identifiers by said user at said user device.

28. The method according to claim 22, wherein said step of accumulating from said identifier database selected ones of said user-cognizable identifiers in said at least one list further comprises the step of modifying said at least one list including said user-cognizable identifiers by said user at said user device.

29. The method according to claim 22, wherein said step of storing in an identifier database is comprised of storing in an identifier database disposed within said user device.

30. The method according to claim 22, wherein said identifier database is disposed in conjunction with said central computer.

31. The method according to claim 22, wherein said step of storing a user-cognizable identifier includes storing a user-readable description of an item corresponding to said identifying code.

32. The method according to claim 31, wherein said step of storing a user-readable description includes storing a unit price.

33. The method according to claim 31, wherein said step of storing a user-readable description includes storing nutritional data.

34. The method according to claim 22, wherein said step of storing a user-cognizable identifier includes storing a pictorial representation of an item corresponding to said identifying code.

35. The method according to claim 22, wherein said step of selectively associating a transaction identifier comprises selectively associating data indicative of information necessary for accessing said selected merchant database by said user including user account number.

36. The method according to claim 35, wherein said step of selectively associating a transaction identifier includes transmitting said user and/or merchant identifications from said user device over said communications link to said merchant database via said central computer.

37. The method according to claim 36, wherein said step of selectively associating a transaction identifier includes transmitting user and/or merchant identifications from a transaction identifier selected by said user from a list of plural transaction identifiers stored within said user device.

38. The method according to claim 22, wherein said step of selectively associating a transaction identifier includes selectively associating a transaction identifier disposed external to and independent from said user device.

39. The method according to claim 38, wherein said step of selectively associating a transaction identifier includes selectively associating a transaction identifier with said user device via machine recognition of said user and/or merchant identifications.

40. The method according to claim 39, wherein said step of selectively associating a transaction identifier via machine recognition of said user and/or merchant identifications is executed by bar code detection and analysis circuitry.

41. The method according to claim 22, wherein said step of commanding said user device comprises user establishment of said communication by selecting a user-responsive element associated with said user device.

42. The method according to claim 41, wherein said step of user establishment of said communication comprises selecting a region on a touch-sensitive display disposed within said user device.

43. The method according to claim 41, wherein said step of user establishment of said communication comprises selecting a function key disposed on said user device.

44. The method according to claim 22, wherein said step of passing transaction specific information further includes passing advertising and promotional information supplied by said selected merchant database to said user device.

45. A remote ordering system for processing at least one order list of at least one user-selected item to be ordered, each said item having a corresponding item code, said system comprising:

a central inventory database;

a user-specific database of user-discernable item data corresponding to said item codes;

central processing means for providing remote communication over a multi-user network between said central inventory database and said user-specific database in response to a user action for teaching user-discernable item data received from said central inventory database to said user-specific database, for interactively updating said user-discernable item data contained within said user-specific database with replacement user-discernable item data received from said central inventory database in response to a user action, and for aging-out infrequently accessed user-discernable item data from said user-specific database;

memory means in communication with said central processing means and thus to said user-specific database for maintaining said at least one order list; and an order device associated with said user-specific database, in communication with said central inventory database via said central processing means and said multi-user network, and responsive to user input, said order device comprising:

communication means for interfacing said order device with said central processing means;

identifier means for providing said remote ordering system with user and/or merchant information;

input means for providing said order service with said item codes corresponding to said at least one user-selected item to be ordered;

a display in communication with said memory means and said central processing means for providing order pertinent information, including said user-discernable item data, to a user; and management means for controlling said display and said communication means, said management means responsive to said user input and said central processing means, wherein said user-discernable item data to be taught and said replacement user-discernable item data correspond only to said at least one user-selected item to be ordered of said at least one order list and are interactively receivable as a result of said central processing means, responding to said user input at said order device, transmitting to said central inventory database said at least one order list comprising a list of items to be ordered or a provisional list of items for which updated user-discernable item data is desired.

46. The system according to claim 45, wherein each said user-discernable item code corresponds to a plurality of unique products.

47. The system according to claim 45, wherein each said item code is comprised of a bar code.

48. The system according to claim 47, wherein said input means comprises a bar code reader and bar code detection circuitry.

49. The system according to claim 45, wherein said central inventory database comprises said user-discernable item data.

50. The system according to claim 45, wherein said central inventory database comprises promotional information to be communicated to said order device.

51. The system according to claim 45, wherein said central inventory database is physically disposed within said central processing means.

52. The system according to claim 45, wherein said user-specific database is physically disposed within said central processing means.

53. The system according to claim 45, wherein said user-specific database is physically disposed within said order device.

54. The system according to claim 45, wherein said user-discernable item data includes a user-readable description of an item corresponding to an item code.

55. The system according to claim 54, wherein said user-readable description includes a unit price.

56. The system according to claim 54, wherein said user-readable description includes nutritional data.

57. The system according to claim 45, wherein said user-discernable item data includes a pictorial representation of an item corresponding to an item code.

58. The system according to claim 45, wherein said user-discernable item data is taught to said user-specific database if said user-discernable item data has not been previously taught to said user-specific database.

59. The system according to claim 45, wherein said user-discernable item data within said user-specific database is updated if said user-discernable item data within said user-specific database is not identical to said user-discernable item data from said central inventory database.

60. The system according to claim 45, wherein said infrequently accessed user-discernable item data is aged out of said user-specific database when said user-specific database has reached a predetermined capacity.

61. The system according to claim 45, wherein said central processing means further provides promotional information from said central inventory database to said user-specific database.

62. The system according to claim 45, wherein said memory means is disposed within said order device.

63. The system according to claim 45, wherein said memory means is disposed within said central processing means.

64. The system according to claim 45, wherein said at least one order list further includes at least one interim list currently being compiled by a user, said at least one interim list being accessible for review and modification at said order device.

65. The system according to claim 45, wherein said identifier means comprise data indicative of information necessary for accessing said central inventory database by a user including a user account number.

66. The system according to claim 45, wherein said identifier means are disposed within said order device.

67. The system according to claim 66, wherein said identifier means are selectable by said user from a list of said identifier means stored within said order device.

68. The system according to claim 45, wherein said identifier means are disposed external to and independent from said order device.

69. The system according to claim 68, wherein said identifier means are selectively associated with said order device via machine recognition of said identifier means.

70. The system according to claim 69, wherein said machine recognition of said identifier means is executed by bar code detection and analysis circuitry.

71. The system according to claim 45, wherein said display further provides promotional information to a user.

72. The system according to claim 45, wherein said order device further comprises at least one user-responsive element.

73. The system according to claim 72, wherein said display is a touch-sensitive display, and wherein said at least one user-responsive element comprises a region on said touch-sensitive display.

74. The system according to claim 72, wherein said at least one user-responsive element comprises a function key disposed on said order device.

75. The system according to claim 72, wherein said at least one user-responsive element comprises an external pointing device.

* * * * *